United States Patent
Kühne et al.

(10) Patent No.: US 8,276,939 B2
(45) Date of Patent: Oct. 2, 2012

(54) AIRBAG FOR A VEHICLE OCCUPANT PROTECTIVE SYSTEM

(75) Inventors: Klaus-Peter Kühne, Karlsfeld (DE); Karl-Heinz Sommer, Stockdorf (DE); Thomas Reiter, Vierkirchen (DE); Marcus Weber, Untertheres (DE); Marc Schock, Karlsfeld (DE); Jörg Albert, Germering (DE); Tomas Ågren, Kode (SE); David Jacobsson, Göteborg (SE); Jonas H. Gustafsson, Nossebro (SE); Ulrika Fredriksson, Partille (SE)

(73) Assignee: Autoliv Development AB, Vargarda (SE)

( * ) Notice: Subject to any disclaimer, the term of this patent is extended or adjusted under 35 U.S.C. 154(b) by 186 days.

(21) Appl. No.: 12/603,164

(22) Filed: Oct. 21, 2009

(65) Prior Publication Data
US 2010/0264634 A1     Oct. 21, 2010

(30) Foreign Application Priority Data
Oct. 21, 2008 (DE) .......... 10 2008 052 566

(51) Int. Cl.
*B60R 21/239* (2006.01)
(52) U.S. Cl. ........ 280/739; 280/743.2; 280/732
(58) Field of Classification Search ........ 280/739, 280/743.2, 732, 731, 730.2, 728.1; 493/225
See application file for complete search history.

(56) References Cited

U.S. PATENT DOCUMENTS

| | | | | |
|---|---|---|---|---|
| 6,139,048 A | * | 10/2000 | Braunschadel | 280/728.1 |
| 7,651,130 B2 | * | 1/2010 | Bauberger | 280/743.2 |
| 7,784,828 B2 | * | 8/2010 | Matsu et al. | 280/739 |
| 7,938,444 B2 | * | 5/2011 | Williams et al. | 280/743.2 |
| 2006/0071461 A1 | | 4/2006 | Williams et al. | |
| 2007/0126218 A1 | | 6/2007 | Schnieder et al. | |
| 2008/0023950 A1 | | 1/2008 | Kalczynski et al. | |
| 2008/0073893 A1 | * | 3/2008 | Schneider | 280/740 |
| 2009/0152842 A1 | * | 6/2009 | Benny et al. | 280/728.3 |
| 2009/0256338 A1 | * | 10/2009 | Williams | 280/735 |

FOREIGN PATENT DOCUMENTS

DE 102007029392 3/2008
JP 05-085295 4/1993

* cited by examiner

*Primary Examiner* — Paul N Dickson
*Assistant Examiner* — Keith Frisby
(74) *Attorney, Agent, or Firm* — Harness, Dickey & Pierce, P.L.C.

(57) ABSTRACT

An airbag for a vehicle occupant protective system comprises an inflatable cushion, a cinch tube circumventing a vent aperture disposed in the cushion, and a draw element guided in a circumventing channel of said cinch tube and being coupled to a surface of said cushion such that deployment of said cushion causes said draw element to contract said cinch tube. The airbag comprises a contraction limiting arrangement adapted to limit the contraction of said cinch tube by said draw element to a predetermined minimum free diameter d of at least 20% relative to the free diameter D of the open cinch tube.

18 Claims, 7 Drawing Sheets

ND SYSTEM

CROSS-REFERENCE TO RELATED APPLICATIONS

This application claims the benefit and priority of DE 10 2008 052566.9, filed Oct. 21, 2008, the entire disclosure of which is incorporated herein by reference.

FIELD

The present disclosure relates to an airbag for a vehicle occupant protective system.

BACKGROUND

This section provides background information related to the present disclosure which is not necessarily prior art.

US 2006 0071461 A1 discloses an airbag which deployment of the cushion causes a cinch cord to contract the cinch tube. If the occupant is in a usual position the cushion can be fully inflated. In the fully inflated state the cinch tube is essentially completely closed by the cinch cord in order to retain the gas in the cushion for normal occupant restraint. However, in case the occupant is not in a belted normal position the occupant may contact the airbag during deployment, i.e. before it is fully inflated. In this case a softer deployment is desired in order to avoid injury of the occupant by the airbag. To this end the restricted inflation of the cushion stops the cinch cord pulling, such that the cinch tube remains relatively wide open and allows gas to escape rapidly. Therefore, the size of the cinch tube aperture is automatically regulated depending on the position of the occupant. The airbag may comprise additional fixed-size vent openings for providing venting in the case of a fully inflated cushion and closed cinch tube, which is also called in-position venting. However, the provision of a cinch tube and additional in-position vent openings causes additional costs in the manufacture of the airbag. Furthermore, it is difficult to arrange a cinch tube and additional vent openings on the airbag because the area on the airbag where hot gases escaping through an opening are directed away from the occupant is very limited.

SUMMARY

The object of the invention is to provide a cost-effective airbag which provides venting in the case of a fully inflated cushion and a softer deployment in case the occupant contacts the airbag during deployment before it is fully inflated.

In case the occupant contacts the airbag before it is fully inflated, the restricted inflation of the cushion stops the cinch cord pulling such that the cinch tube remains relatively wide open and a softer deployment is achieved. In case the cushion can be fully inflated, according to the invention the contraction limiting arrangement limits the contraction of the cinch tube by the draw element to a predetermined minimum free diameter of at least 20% relative to the free diameter of the open cinch tube. I.e. even in the fully inflated state the cinch tube is not completely closed, but is held open at a definite minimum free diameter in order to provide venting also in the case of a fully inflated cushion. In other words, the invention provides with simple means an integration of the in-position vent into the cinch tube. Due to the contraction limiting arrangement no in-position vent openings in addition to the cinch tube is required, which saves time and costs in the manufacturing process.

The contraction limiting arrangement may be realised in different manners. A simple but effective solution is that the draw element does not extend around the whole circumference of the open cinch tube, but only around a portion of 80% or less of the circumference, giving rise to a contractable or closable portion of 80% or less of the circumference and a non-contractable or flat portion of 20% or more of the circumference. The separation between the contractable and the non-contractable portions is preferably achieved by means of separator elements along said channel, wherein said separator elements have a distance to each other of at least 20% of the perimeter of the open cinch tube. The separator elements may in particular be formed by an opening in said channel from which said draw element extends away from said channel in the inflated state, or by a connection of the draw element to the cinch tube.

Another preferred possibility to realise the contraction limiting arrangement is that the draw element comprises a stopper interacting with a stop hole to limit the movement of said draw element.

The invention shall be illustrated on the basis of preferred embodiments with reference to the accompanying drawings in which:

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION OF VARIOUS ASPECTS

Figure 1A:
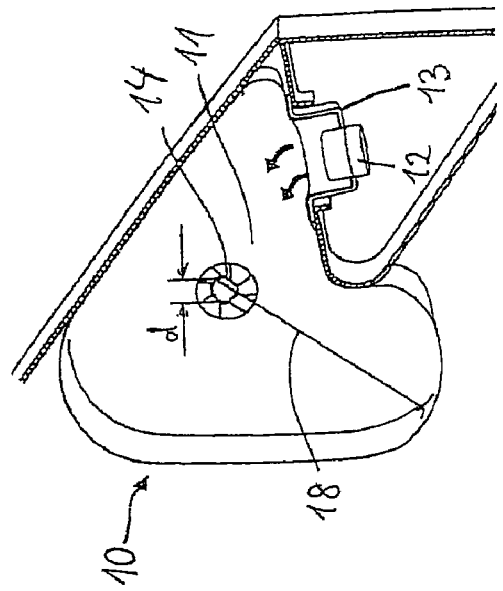
FIG. 1A shows a perspective cross-sectional view of an airbag in an initially deploying state.

Example embodiments will now be described more fully with reference to the accompanying drawings.

FIGS. 1A through 10 depict an airbag 10 with an airbag cushion 11 and a pyrotechnical gas generator 12 controllable to inflate the cushion 11 in response to a crash detection signal. The cushion 11 deploys from a housing 13 to which the gas generator 12 is mounted. The cushion 11 comprises a flexible cinch tube 14 which circumvents a vent aperture 15 in the cushion 11. The cinch tube 14 may be cylindrical with a free open end 16 and an opposite open end 17 at which the cinch tube 14 is connected to the cushion 11 around the vent aperture 15, see in particular FIGS. 5 and 7. Preferably the cinch tube 14 is made of a textile material, in particular the same or a similar material as the cushion 11, which contributes to cost reduction.

The airbag 10 comprises a draw element 18 that is coupled to the cinch tube 14 on the one hand and coupled to the cushion 11 on the other. More specifically, a channel 19 formed by a sleeve is provided at the free end 16 of the cinch tube 14 (see FIGS. 5, 7, 8A). The channel 19 at least partially circumvents an opening 20 formed by the free end 16 of the cinch tube 14. The draw element 18 is guided within the channel 19 such that pulling the draw element 18 away from the cinch tube 14 operates to contract the cinch tube 14 at its free end 16 and therefore to close the opening 20, as will be explained in the following. The draw element 18 may be positioned inside or outside the airbag cushion 11.

In FIG. 1A the initially deploying cushion 11 has a slack draw element 18 and the cinch tube 14 remains open such that the opening 20 has a maximum free diameter D.

Figure 1B:
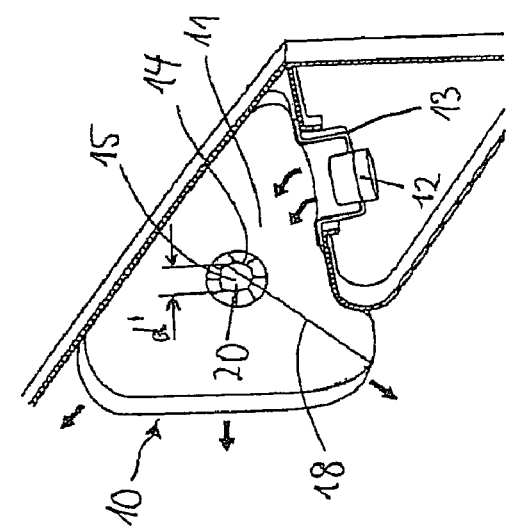
FIG. 1B shows a perspective cross-sectional view of the airbag of FIG. 1A in an intermediate deploying state.
Figure 1C:
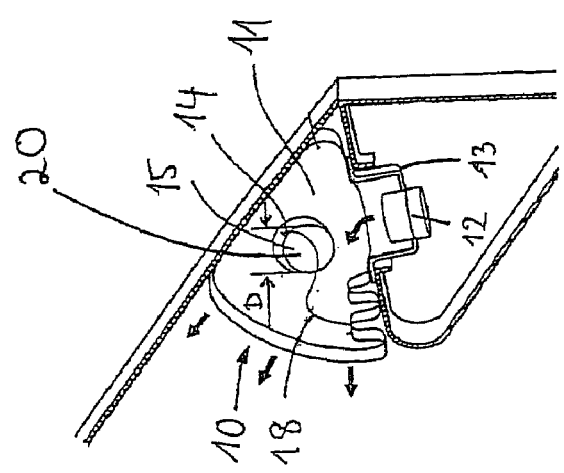
FIG. 1C shows a perspective cross-sectional view of the airbag of FIGS. 1A, 1B in the fully deployed state.

In FIG. 1B the deploying cushion 11 in an intermediate state causes the draw element 18 to be pulled taut such that the cinch tube 14 begins to close and the free diameter of the opening 20 reduces.

If the occupant contacts the cushion 11 in an intermediate state before it is fully deployed, which may happen in particular in case the occupant is out-of-position before crash, further deployment of the cushion 11 is stopped and the opening 20 of the cinch tube 14 is held relatively wide open with an intermediate free diameter d' between the maximum free diameter D and a minimum free diameter d which shall be explained below. The safety vent opening 20 with an intermediate free diameter d' allows a more rapid outlet of gas which leads to a softer impact on the occupant.

Figure 2A:
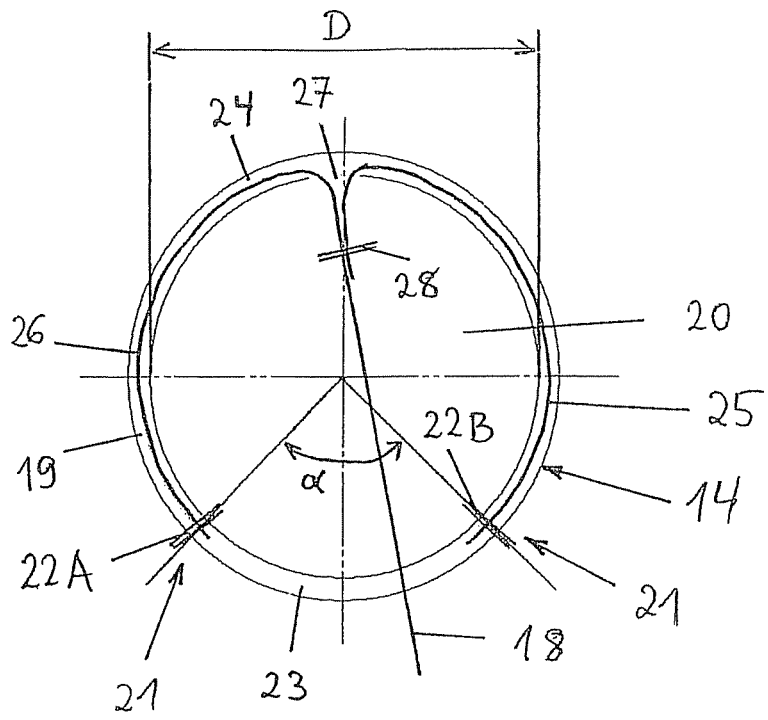
FIG. 2A shows a cross-sectional view of a cinch tube in one embodiment in an initially deploying state.
Figure 2B:
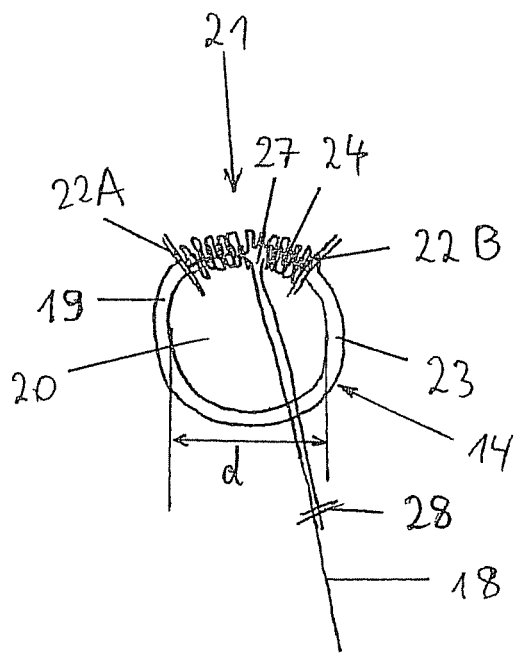
FIG. 2B shows a cross-sectional view of the cinch tube of FIG. 2A in the fully deployed state.

In case the cushion 11 can deploy to its full size, which is usually the case if the occupant is in a regular belted position before crash, the draw element 18 closes the cinch tube 14 until a predetermined minimum free diameter d of at least 20% relative to the free diameter D of the open cinch tube 14 is reached. In this state, which is shown in FIGS. 10, 2B and 8B, further contraction of the cinch tube 14 is prevented by a contraction limiting arrangement 21 (see FIGS. 2B, 8B). Unlike US 2006 0071461 A the cinch tube 14 is not fully closed, but an in-position vent 20 of diameter d remains open for providing venting also for a fully inflated cushion 11. Preferably the minimum free diameter d is at least 20%, preferably at least 25%, more preferably at least 30%, still more preferably at least 40% relative to the free diameter D of the open cinch tube. Preferably the minimum free diameter d relative to D is not larger than 80%, preferably not larger than 70%, still more preferably not larger than 60%.

The contraction limiting arrangement 21 may be realised in different manners. In the preferred embodiments of FIGS. 2 to 7 the contraction limiting arrangement 21 is realised by two separator elements 22A, 22B separating the circumference of the cinch tube 14 into a non-contractable portion 23 and a contractable portion 24. The separator elements 22A, 22B are arranged at a distance L of at least 20%, preferably at least 30%, more preferably at least 40% of the circumference of the cinch tube 14, and/or arranged to include an angle α (see FIGS. 2A, 9) of at least 72°, preferably at least 90°, more preferably at least 108°, still more preferably at least 144° measured from the centre of the cinch tube 14. The channel 19 connects the separator elements 22A, 22B by running over the whole contractable portion 24.

In the embodiment of FIG. 2, the channel 19 comprises an opening 27 through which the draw element 18 enters the channel 19. The draw element 18 splits into two portions 25, 26 which are guided inside the channel 19 and extend in opposite directions from the opening 27. In this example the portion 25 is a separate part connected to the main portion of the draw element 18 with a connector 28. Inside the channel 19 the portions 25, 26 extend over the whole contractable portion 24. In the embodiment of FIG. 2 the separator elements 22A, 22B are seams attaching the draw element 18, 25 to the cinch tube 14. When the deploying airbag cushion 11 pulls at the draw element 18, 25, the draw element 18, 25 pulls at the seams 22A, 22B which causes contraction or shrinkage of the contractable portion 24, whereas the non-contractable part 23 remains un-contracted at its full length L. When the material of the contracted portion 24 prevents further movement of the seams 22A, 22B, which state is shown in FIG. 2B, the free diameter d of the opening 20 is essentially determined by the length L of the non-contractable portion 23.

Figure 3:
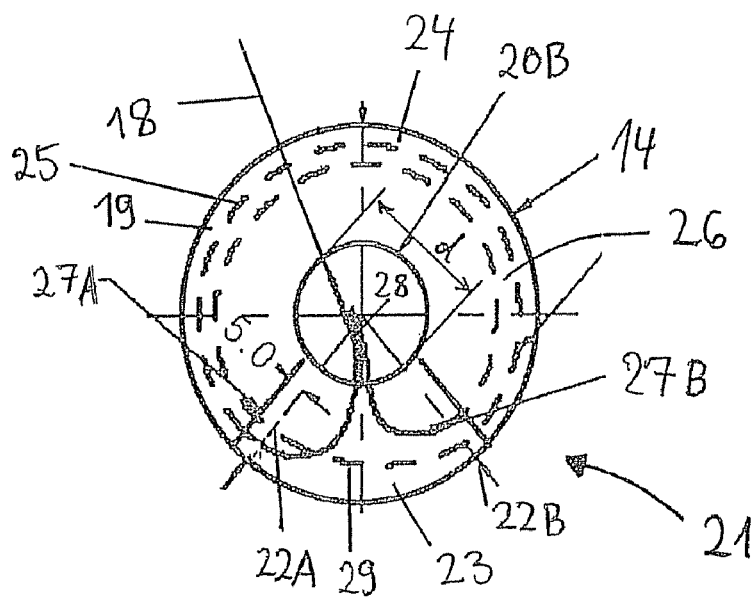
FIG. 3 shows a cross-sectional view of a cinch tube in another embodiment in an initially deploying state.
Figure 4:
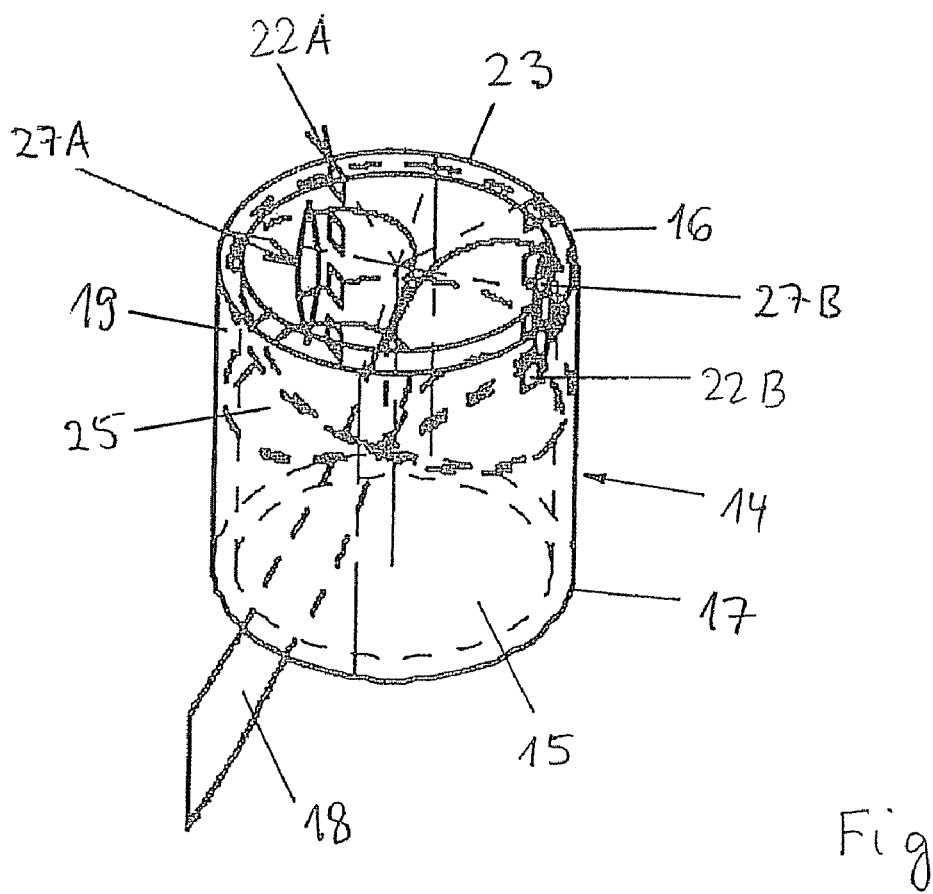
FIG. 4 shows a cross-sectional perspective view of the cinch tube of FIG. 3.

The draw element 18 is preferably made of a textile strap, as can be seen in FIG. 4, preferably from the same material as the cinch tube 14 and/or the airbag cushion 11. The textile strap 18 may be crossing itself inside the channel 19, as shown in FIGS. 3 and 4, in order to increase the friction. This advantageously impedes undesired withdrawing of the draw element 18 after the crash, i.e. the cinch tube 14 remains contracted.

In the embodiment shown in FIGS. 3 and 4 the channel 19 comprises two openings 27A, 27B spaced apart from each other. The draw element 18 enters through one opening 27A into the channel 19, is guided a complete lap around the whole contractable portion 24 and further to the other opening 27B where it leaves the channel 19 and is attached to the draw element 18 by a connector 28. In this embodiment also, the separator elements 22A, 22B are seams attaching the portions 25, 26 of the draw element 18 to the cinch tube 14. Because of the seams 22A, 22B the pulling force is not acting on the portion 29 of the draw element 18 between the seams 22A, 22B. Therefore the portion 23 of the cinch tube between the seams 22A, 22B is not contracted. In the fully contracted state of the cinch tube 14, the opening 20B remains at the free diameter d for in-position venting.

Figure 5:
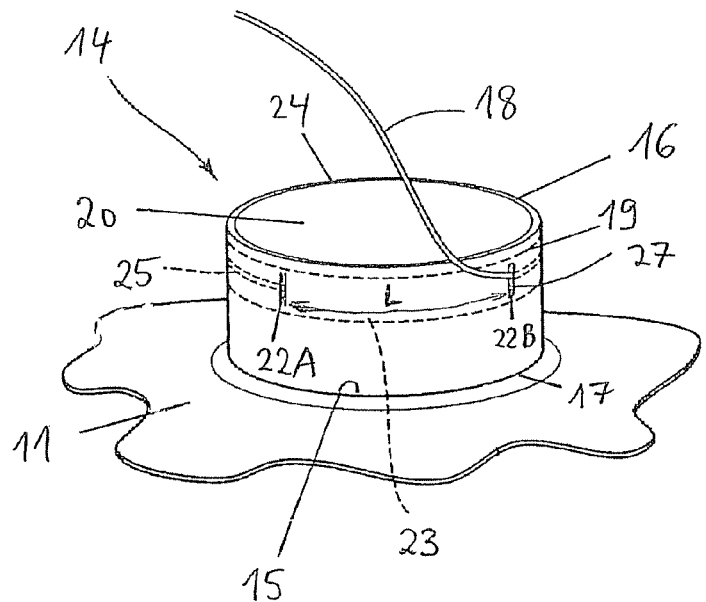
FIG. 5 shows a perspective view of a cinch tube in another embodiment in an initially deploying state.
Figure 6:
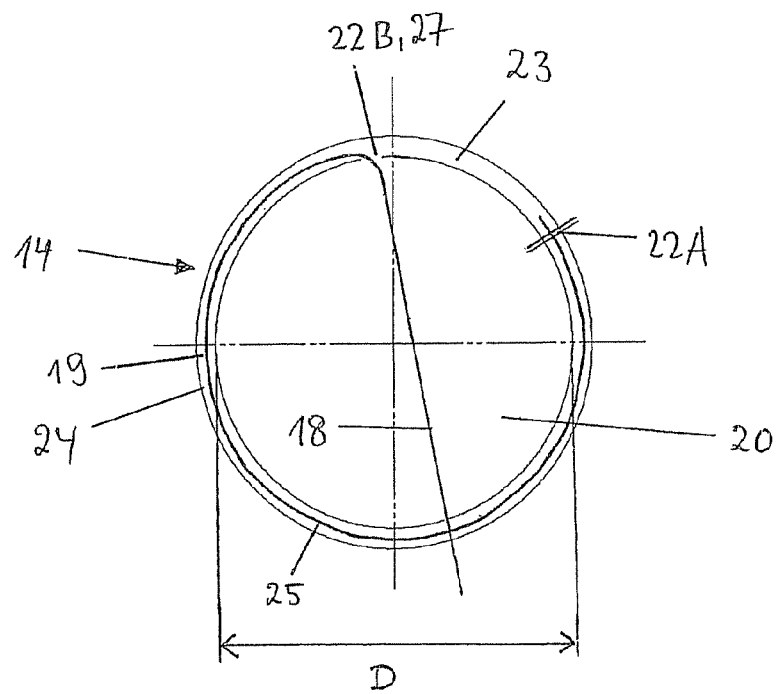
FIG. 6 shows a cross-sectional perspective view of the cinch tube of FIG. 5.

In the embodiment shown in FIGS. 5 and 6 the draw element 18 enters through an opening 27 into the channel 19 wherein it is guided around more than 72°, preferably more than 108°, further preferably more than 144°, and is finally attached to the cinch tube 14 by a seam 22A. In this case the separator elements 22A, 22B are formed by the seam 22A and the opening 27.

Figure 7:
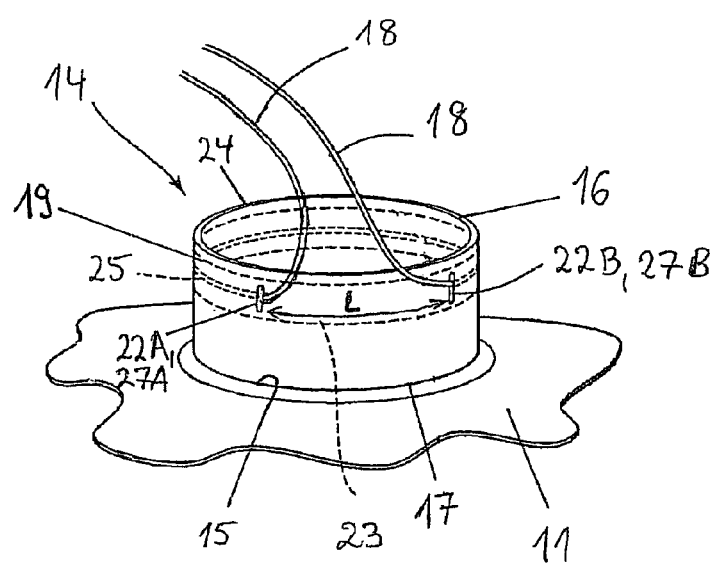
FIG. 7 shows a perspective view of a cinch tube in another embodiment in an initially deploying state.

In the embodiment according to FIG. 7 the draw element 18 enters through a first opening 27A into the channel 19 wherein it is guided around more than 72°, preferably more than 108°, further preferably more than 144°, and finally leaves the channel 19 through a second opening 27B arranged at a distance L from the first opening 27A of more than 20% of the circumference of the cinch tube 14. In this case the separator elements 22A, 22B are formed by the openings 27A, 27B.

Figure 8A:
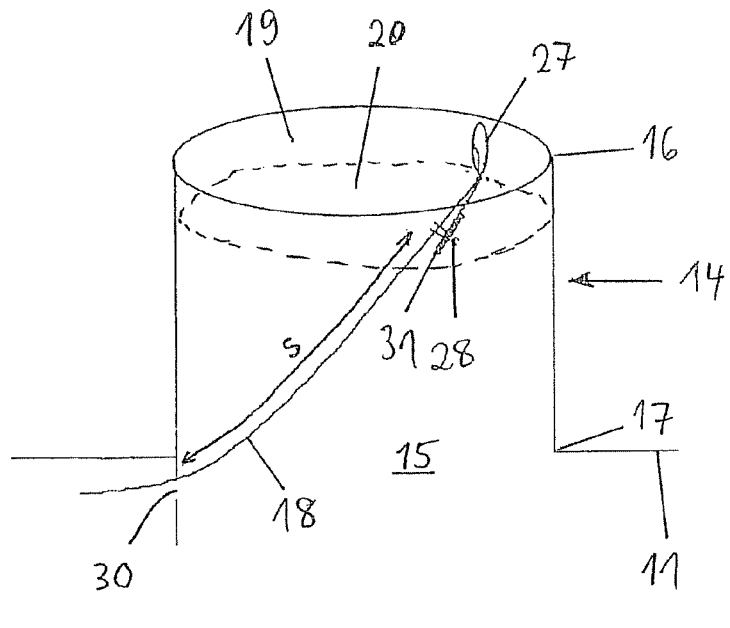
FIG. 8A shows a perspective schematic view of a cinch tube in a further embodiment in an initially deploying state.
Figure 8B:
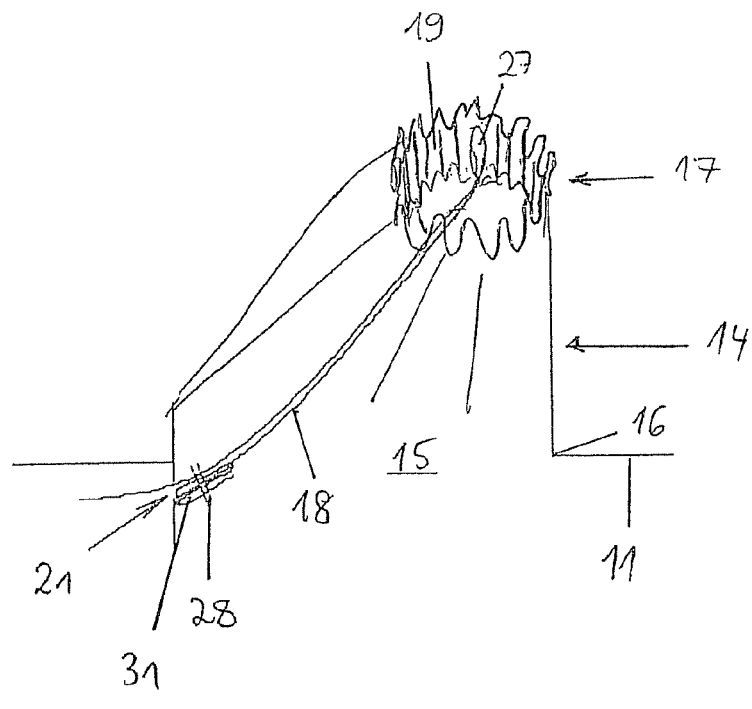
FIG. 8B shows a perspective schematic view of the cinch tube of FIG. 8A in the fully deployed state.

The embodiment of FIGS. 8A, 8B illustrate that the contraction limiting arrangement 21 can also be achieved in other ways. Here, the cinch tube 14 comprises a stop hole 30 through which the free part of the draw element 18 is guided, and the draw element 18 comprises a stopper 31 interacting with the stop hole 30. The stopper 31 may for example be formed by the connector 28. The distance s between the stopper 31 in the initial state shown in FIG. 8A, where the opening 20 has the maximum free diameter D, and the stop hole 30 is arranged such that when the stopper 31 is stopped by the stop hole 30, the opening 20 has a predetermined minimum free diameter d of at least 20% relative to the free diameter D of the open cinch tube. FIG. 8B makes evident that in this embodiment the circumference of the cinch tube 14 is not separated into a non-contractable and a contractable portion, but the cinch tube 14 is uniformly contracted over its whole circumference.

Figure 9:
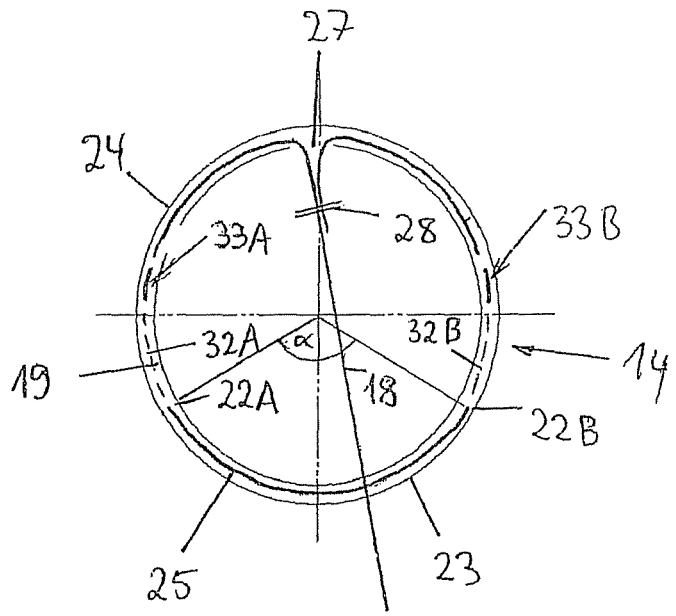
FIG. 9 shows a cross-sectional view of a cinch tube in a further embodiment in an initially deploying state.
Figure 10A:
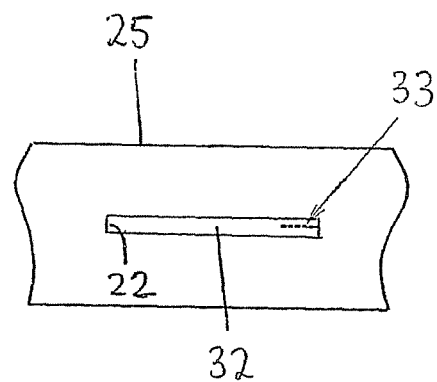
FIG. 10A shows part of the cinch tube of FIG. 9 in an initially deploying state.
Figure 10B:
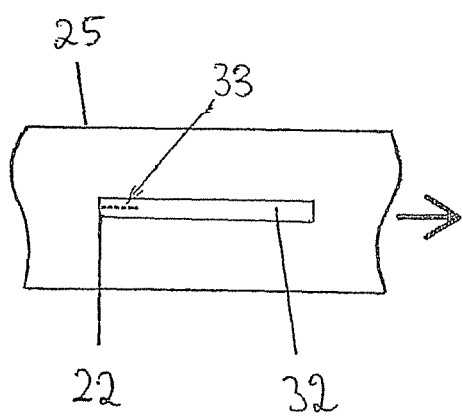
FIG. 10B shows part of the cinch tube of FIG. 9 in a fully deployed state.

In the embodiment according to FIGS. 9 and 10 the draw element 18 enters through an opening 27 into the channel 19 wherein it is guided around a whole lap and finally leaves the channel 19 through the same opening 27 to become attached to the draw element 18 by a connector 28. The portion 25 of the draw element 18 inside the channel 19 comprises long holes 32 (generically) and 32A, 32B (specifically) arranged for example symmetrically with respect to the opening 27. Each long hole 32A, 32B is engaged by a corresponding seam 33 (generically) and 33A, 33B (specifically) which connects opposite walls of the channel 19. The initial state where the opening 20 has a maximum diameter D is shown in FIGS. 9 and 10A. When the airbag cushion 11 inflates and the draw element 18 is pulled, the long holes 32A, 32B move along the seams 33A, 33B starting contraction of the cinch tube 14. When the ends 22A, 22B of the long holes 32A, 32B reach the seams 33A, 33B, the long holes 32A, 32B carry the seams 33A, 33B with them leading to further contraction. When the material of the contracted portion 24 prevents further movement of the seams 33A, 33B, the free diameter d of the opening 20 is essentially determined by the length L of the non-contractable portion 23 between the ends 22A, 22B of the long holes 32A, 32B. In this case the separator elements 22A, 22B are formed by the ends 22A, 22B of the long holes 32A, 32B interacting with the seams 33A, 33B.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An airbag for a vehicle occupant protective system comprising:
    an inflatable cushion having a vent aperture;
    a cinch tube circumventing the vent aperture disposed in the cushion, the cinch tube having a free diameter when open;
    a draw element coupled to the airbag such that deployment of the cushion causes the draw element to contract the cinch tube; and
    a contraction limiting arrangement adapted to limit the contraction of the cinch tube by the draw element to a predetermined minimum free diameter of at least 20% relative to the free diameter of the cinch tube;
    wherein the draw element includes a first branch secured to the cinch tube at a first point and a second branch secured to the cinch tube at a second point.

2. The airbag according to claim 1, wherein the draw element extends around 80% or less of the perimeter of the cinch tube.

3. The airbag according to claim 1, wherein the cinch tube comprises separator elements separating a circumference of the cinch tube into a non-contractable portion and a contractable portion.

4. The airbag according to claim 3, wherein said separator elements enclose an angle of at least 60°.

5. The airbag according to claim 3, wherein at least one of the separator elements is formed by an opening through which the draw element enters into the channel.

6. The airbag according to claim 3, wherein at least one of the separator elements is formed by a connection of the draw element to the cinch tube.

7. The airbag according to claim 6, wherein the connection is formed by a seam fixing the draw element to the cinch tube.

8. The airbag according to claim 3, wherein the separator elements are arranged on opposite sides of a pulling direction of the draw element.

9. The airbag according to claim 3, wherein the draw element extends across the vent aperture and is secured to the separator elements.

10. The airbag according to claim 1, wherein contraction of said cinch tube is limited to a predetermined minimum free diameter of at least 30% relative to the free diameter of the open cinch tube.

11. The airbag according to claim 1, wherein the draw element is a strap element.

12. The airbag according to claim 1, wherein the first and second points are circumferentially spaced apart about a circumference of the cinch tube.

13. The airbag according to claim 1, wherein the draw element is guided in a circumventing channel of the cinch tube.

14. An airbag for a vehicle occupant protective system comprising:
    an inflatable cushion having a vent aperture;
    a cinch tube circumventing the vent aperture disposed in the cushion, the cinch tube having a free diameter when open, the cinch tube further including a circumventing channel with an opening;
    a contraction limiting arrangement adapted to limit the contraction of the cinch tube by the draw element to a predetermined minimum free diameter of at least 20% relative to the free diameter of the cinch tube; and
    a draw element coupled to the airbag such that deployment of the cushion causes the draw element to contract the cinch tube, the draw element including a first branch extending through the opening and at least partially around the cinch tube in a first circumferential direction and a second branch extending through the opening and at least partially around the cinch tube in a second circumferential direction.

15. The airbag according to claim 14, wherein the first and second branches are secured to the cinch tube at spaced apart points.

16. The airbag according to claim 14, wherein the draw element is guided in the circumventing channel of the cinch tube.

17. An airbag for a vehicle occupant protective system comprising:
- an inflatable cushion having a vent aperture;
- a cinch tube circumventing the vent aperture disposed in the cushion, the cinch tube having a free diameter when open; and
- a draw element coupled to a surface of the airbag such that deployment of the cushion causes the draw element to contract the cinch tube, the draw element fixedly secured to first and second spaced apart points on the cinch tube such that contraction of the cinch tube by the draw element is limited to a predetermined minimum free diameter of at least 20% relative to the free diameter of the cinch tube;
- wherein the draw element includes a first branch fixedly attached at the first spaced apart point and a second branch fixedly attached at the second spaced apart point.

18. The airbag according to claim 17, wherein the draw element is guided in a circumventing channel of the cinch tube.

* * * * *